FIG. I

INVENTOR.
EDWARD J. HARRIS
BY J. William Freeman
ATTORNEY

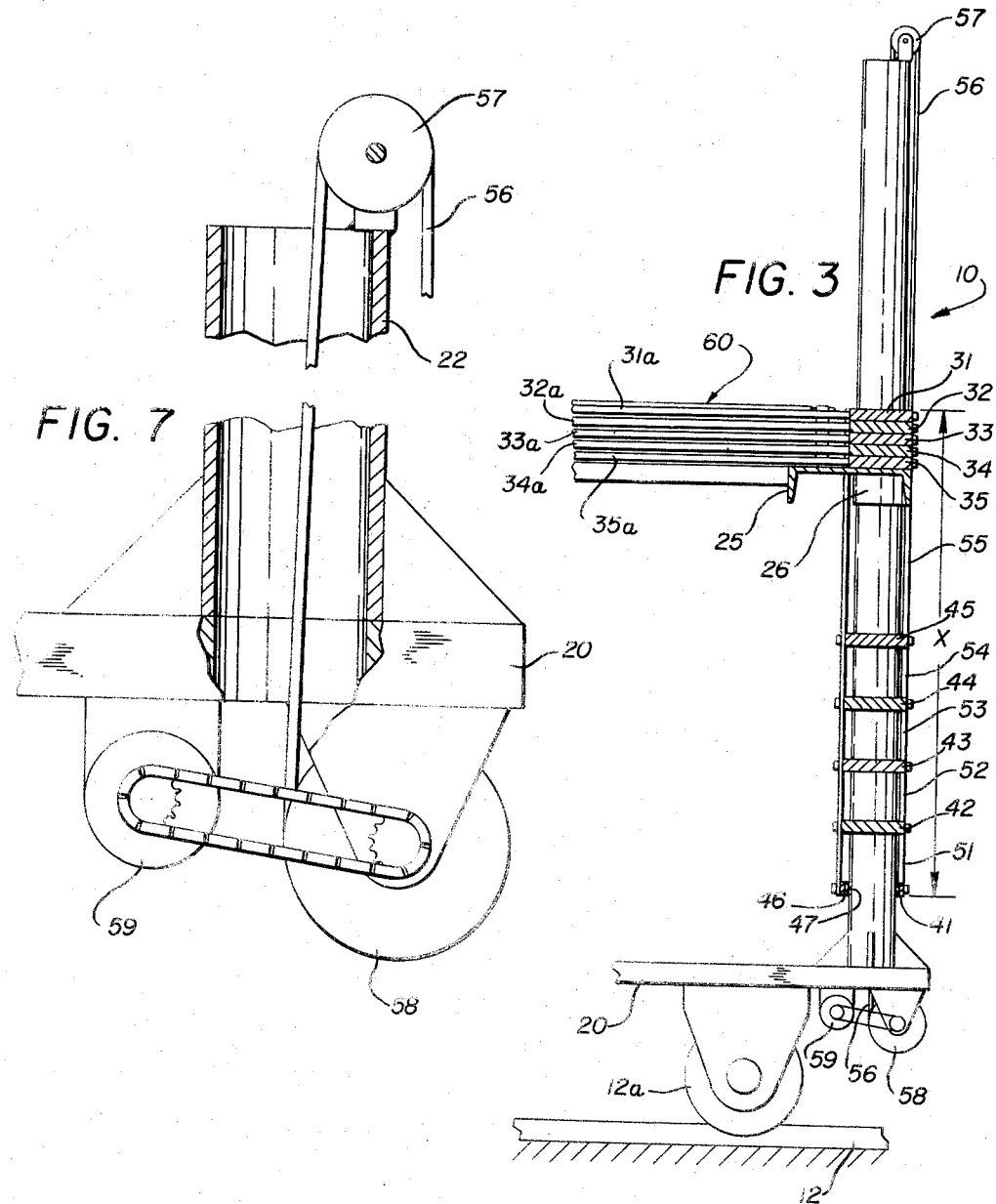

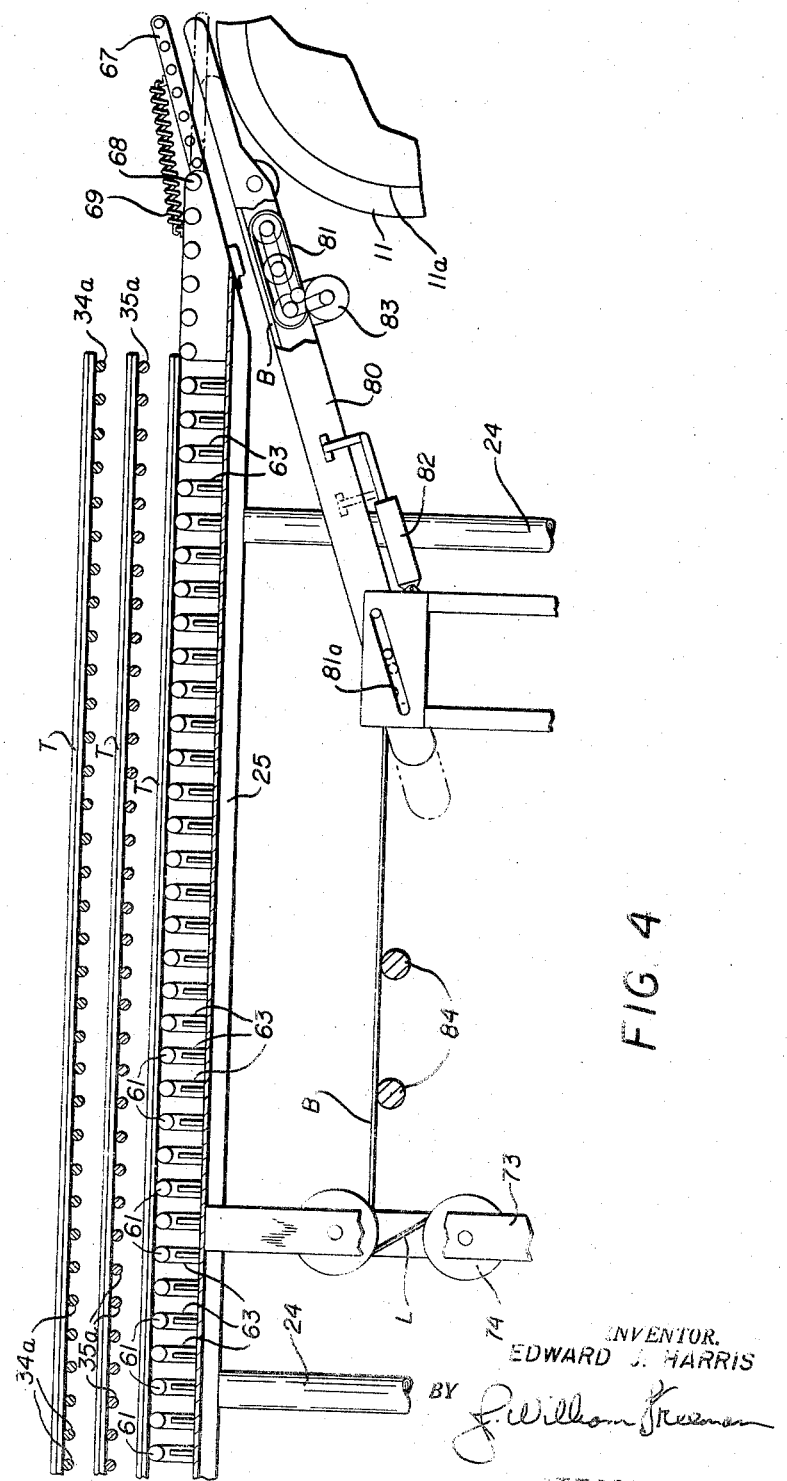

April 29, 1958     E. J. HARRIS     2,832,396
SERVICING APPARATUS FOR TREAD, BREAKER AND CHAFER STOCK
Filed Dec. 10, 1954     5 Sheets-Sheet 5

INVENTOR.
EDWARD J. HARRIS
BY
ATTORNEY

United States Patent Office 2,832,396
Patented Apr. 29, 1958

2,832,396

SERVICING APPARATUS FOR TREAD, BREAKER, AND CHAFER STOCK

Edward J. Harris, Akron, Ohio, assignor to The Cleveland Trust Company, Cleveland, Ohio, as trustee Application December 10, 1954, Serial No. 474,580

11 Claims. (Cl. 154—9)

This invention relates to pneumatic tire making equipment, and has particular reference to servicing apparatus furnishing tread stock, breaker stock and chafer stock to a pneumatic tire building machine.

In the known prior art method of manufacturing pneumatic tires, a plurality of fabric plies are first "built up" around a building drum to assume the cylindrical shape. When the requisite number of fabric plies have been applied to the drum by any one of several types of known prior art servicing devices, the casing is then provided with a central breaker strip and opposed chafer strips that are applied over the external surface of the last ply. When these breaker and chafer strips have been applied as just described, the tread is then positioned around the annular form and at this time, the tire is completed with regard to its building operation, and may then be moved to another department for the "shaping" and "curing" operations that result in a finished product.

In the past, the positioning of the breaker and chafer strips, as well as the positioning of the tread stock, has been carried out, to a great extent, by a manual placement operation; and thus, while the chafer and breaker strips are located adjacent the usual servicer for the fabric plies, the actual placement of the same on the building form is carried out manually. All of the known type of prior art servicers require this manual step of placement, in view of the fact that the same can only carry a limited amount of stock because the turret mechanisms that are conventionally employed therein obviate storage of this tread, breaker and chafer stock below the ply-servicing apparatus per se.

Recently, there has been proposed the manufacture of pneumatic tires, wherein the fabric plies are provided with wire or nylon cord elements. Fabric stock of this type is extremely difficult to handle, in view of the fact that the same does not lend itself to being wrapped in a roll as is the case with the conventional fabric ply employed at this time. Accordingly, it is believed that the conventional servicing equipment of the known prior art type that is now employed will be unsatisfactory for dispensing such newly developed fabric plies to the building form of a pneumatic tire building machine designed to properly form and shape the fabric plies that are provided with wire cord elements.

Accordingly, it is one object of this invention to provide a servicing apparatus for supplying tread, breaker and chafer stock to the building form of a pneumatic tire building machine in a simple and efficient manner.

It is a further object of this invention to provide a servicer for tread stock, the operating principle of which can be utilized to dispense fabric plies having wire or nylon cord elements that reduce the overall flexibility of the ply.

These and other objects of the invention will become more apparent upon a reading of the following brief specification, considered and interpreted in the light of the accompanying drawings.

Of the drawings:

Figure 3 is a view similar to Figure 2, but illustrating the servicer in the unloaded position.

Figure 2:
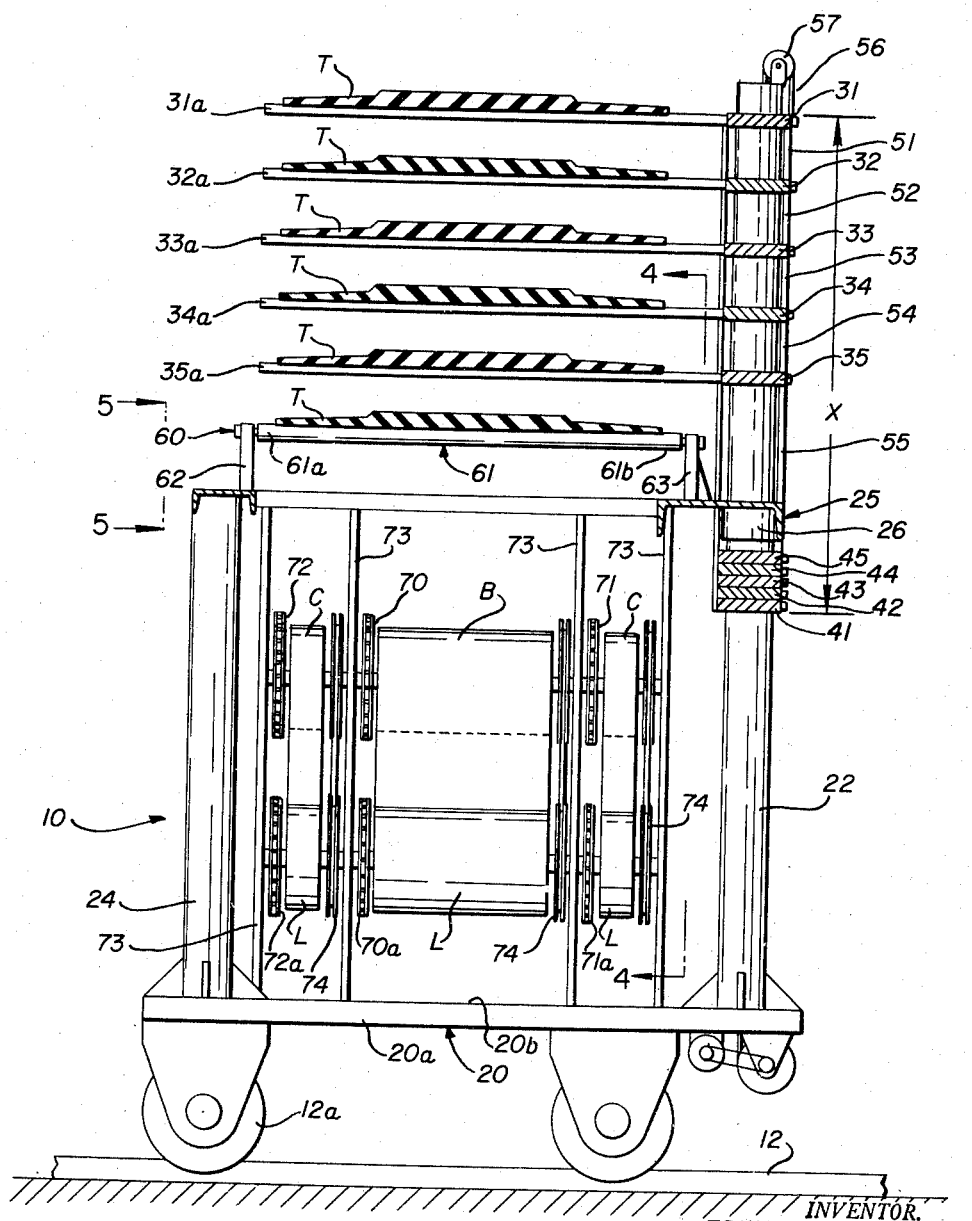
Figure 2 is a sectional view taken on the lines 2—2 of Figure 1, and illustrating the servicer in the loaded position.
Figure 5:
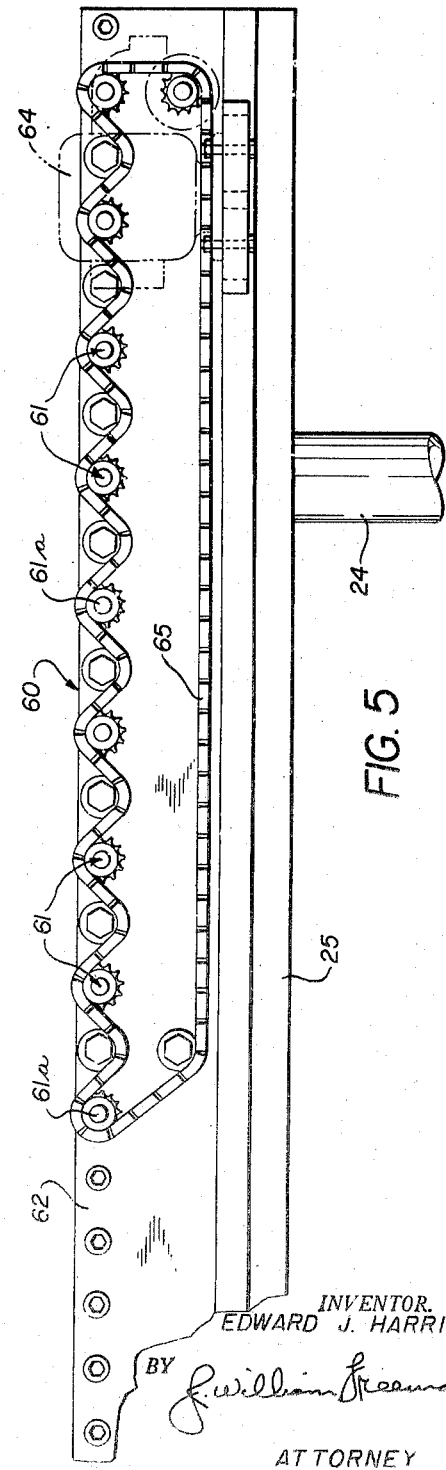

Figures 4 and 5 are views taken on the lines 4—4 and 5—5, respectively, of Figure 2.

Figure 1:
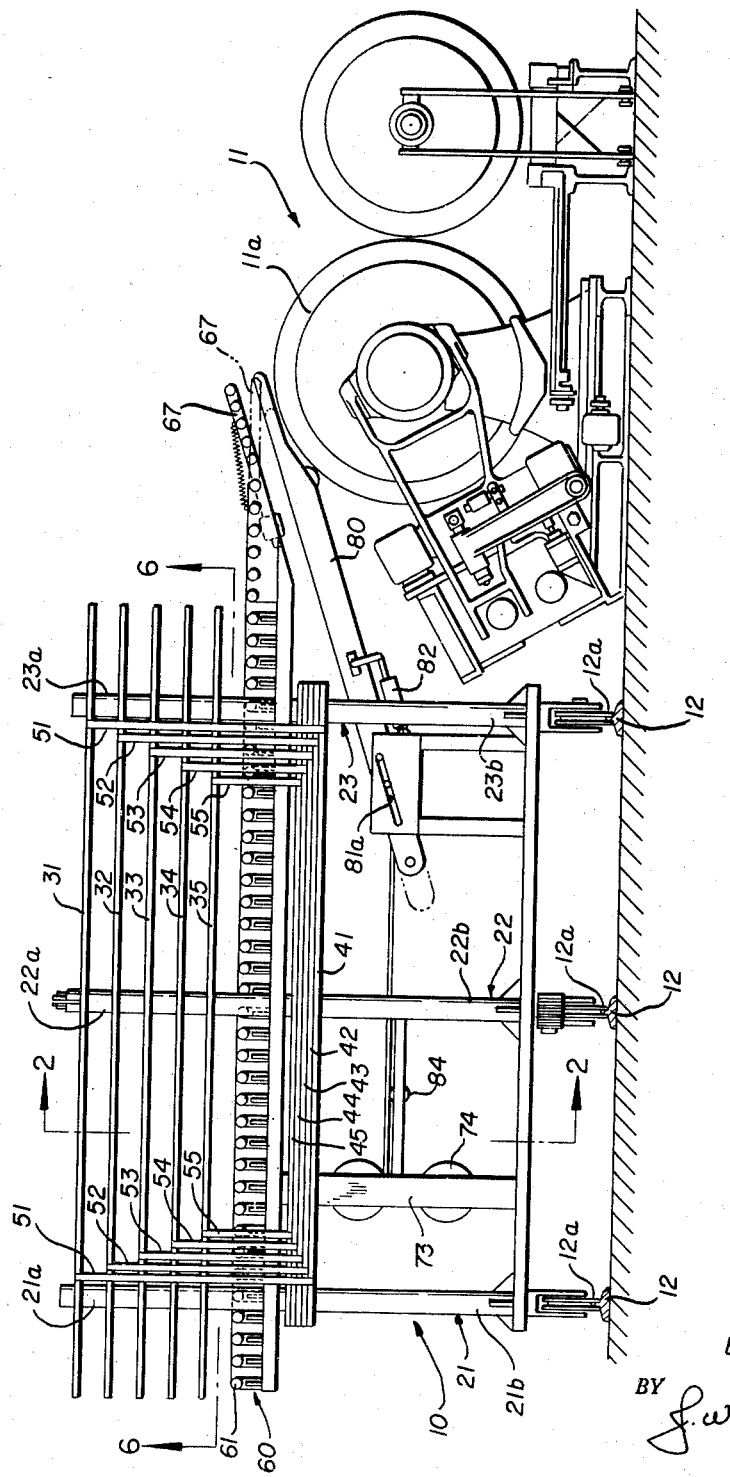
Figure 1 is a side elevation illustrating the improved servicer.
Figure 6:
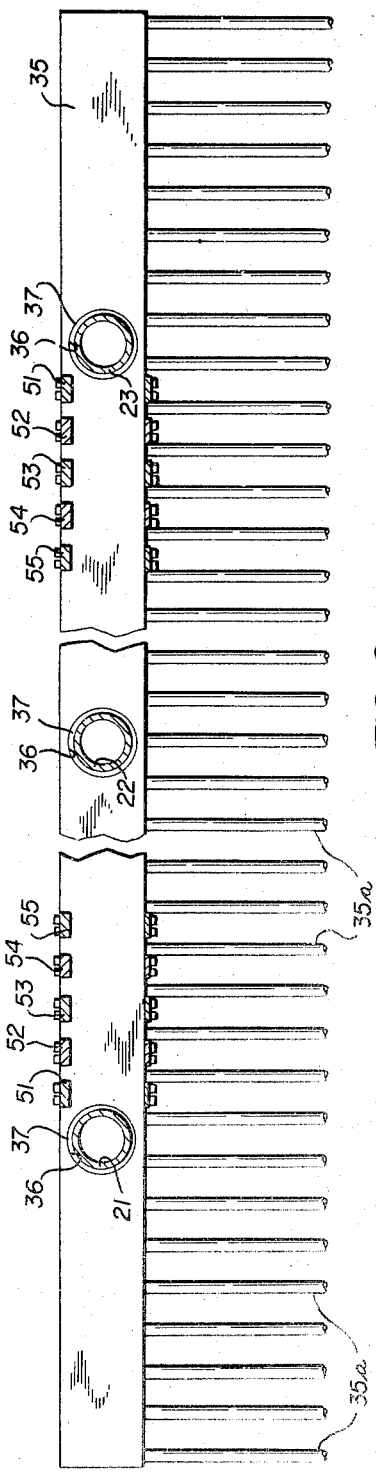

Figure 6 is a view taken on the lines 6—6 of Figure 1.

Figure 7 is a detail view, partly broken away and in section and illustrating the cable means employed to move the servicer from between the loaded and unloaded positions thereof.

Referring now to the drawings, and in particular to Figures 1, 2 and 3 thereof, the improved servicer, generally designated as 10, is shown positioned adjacent a tire building machine 11, so as to be movable longitudinally thereof on tracks 12, 12; the arrangement being such that the servicer 10 is capable of furnishing tread stock T, breaker stock B and chafer stock C onto the building form 11a of the machine 11 in a manner to be described.

The servicer 10 per se, is defined by a rectangular base 20, that includes, on the underside 20a thereof, wheels 12a, 12a that are designed for reception on the tracks 12, 12 in known manner. The top surface 20b of the base 20 serves as a supporting platform for several component elements of the servicer 10, and to this end, one longitudinal edge portion 20c is shown as supporting vertically extending tubular members 21, 22 and 23; while the opposed longitudinal edge portion 20d of the base 20 supports the usual vertical uprights 24, 24 that are in turn attached in known manner, to a spaced rectangular frame 25 (see Figure 2). This frame 25 has a longitudinal edge portion 25a fixed with respect to the tubular members 21, 22 and 23; the usual collars 26, 26 being employed in this regard to achieve a condition of parallelism between the base 20 and the frame 25.

The mechanism employed for effectively storing tread stock T is carried on the frame 25 and the tubular elements 21, 22 and 23, and for the sake of clarity, each tubular element 21, 22 and 23 will be described as including upper sections 21a, 22a and 23a, respectively, as well as lower sections 21b, 22b and 23b, respectively; the point of juncture between the frame 25 and the respective tubular elements 21, 22 and 23 being considered the dividing point between these upper and lower sections (see Figure 2).

Accordingly, a series of rectangular plates 31, 32, 33, 34 and 35, are illustrated as being positioned in axially shiftable condition in the upper sections 21a, 22a and 23a, by use of apertures 36, 36 and bushings 37, 37 that permit axial shifting on the respective tubular elements 21, 22 and 23. A second set of rectangular plates 41, 42, 43, 44 and 45, of equivalent size and shape, are similarly mounted on the lower tubular sections 21b, 22b and 23b; apertures 46, 46 and bushings 47, 47 being employed in this regard to permit the required shifting axially of the respective tubular elements 21b, 22b and 23b.

Referring now to Figures 2 and 3, it will be seen that each of the plates 31, 32, 33, 34 and 35 are always spaced horizontally equidistant from the plates 41, 42, 43, 44 and 45, respectively, irrespective of whether the servicer 10 is in the position of Figure 2 or the position of Figure 3. In this regard, attention is directed to the fact that the vertical distance between the plates 31 and 41, represented by dimension X, is the same in Figures 2 and 3. This maintained horizontal spacing between the respective plates is accomplished by the use of links 51, 51; 52, 52; 53, 53; 54, 54; and 55, 55, that have the opposite ends thereof respectively interconnecting the two series of plates. Thus, the plates 31 and 41 are connected by the links 51, 51, while plates 32, 33, 34 and 35 are respectively connected to plates 42, 43, 44 and 45 by links 52, 52; 53, 53; 54, 54; and 55, 55; the arrangement being such that the just mentioned link members increase in vertical length; with the links 51, 51 being the longest, while the links 55, 55 are the shortest (see Figure 1). In this manner, a series of rigid rectangles of varying heights are provided for movement axially of the tubular members 21, 22 and 23, in a manner to be described.

To this end, the top edge of the plate 31 is shown secured to a cable 56, that is in turn played over a sheave 57 for passage interiorly of the tubular element 22, for example. As best shown in Figure 7, the lower end of cable 56 is received through the base 20, on a windup reel 58, which may be rotated in either direction by energization of a motor 59. In this manner, energization of motor 59 will result in raising or lowering of the aforementioned rectangular structures between the positions of Figures 2 and 3.

While the foregoing plurality of rectangular structures of varying heights operate, upon energization of motor 59, to provide horizontal spacing between the various lengths of tread stock T carried by the servicer 10, the physical support of such tread stock T, prior to delivery to the tire machine 10, is effectuated by a number of tines 31a, 31a; 32a, 32a; 33a, 33a; 34a, 34a; and 35a, 35a; each of which is respectively secured at one end thereof, to the plates 31, 32, 33, 34 and 35 so as to overlie the frame 25 (see Figure 2). Each of the tines 31a, 31a, provided on the plate member 31, for example, is spaced axially with respect to the adjacent tine 31a in horizontally aligned relationship; and the tines are not connected at their free ends. In this manner, the tines 31a, 31a, for example, can pass through the conveyor means 60 so as to receive a length of tread stock T thereon. Tines 32a, 32a; 33a, 33a; 34a, 34a; and 35a, 35a are similarly secured in vertically aligned relationship with respect to plates 32, 33, 34, and 35.

The conveyor means 60 is shown in Figures 2, 3, 4 and 5 as including a plurality of driven friction rolls 61, 61, each having one axial end 61a thereof journalled in a support 62 that extends longitudinally of the frame 25. The opposed axial ends 61b, 61b of rolls 61, 61 are journalled in individual supports 63, 63, that extend longitudinally of the frame 25 and are spaced so as to be out of vertical alignment with the tines 31a, 32a, 33a, 34a and 35a, whereby these tines may be moved vertically past the supports 63, 63. As best shown in Figure 5, the rolls 61, 61 are driven from a motor 64 through a chain 65 that trails over individual sprockets 66, 66 provided on the axial ends 61a, 61a of the rolls 61, 61.

For the purpose of providing apparatus to deliver the stock T from driven rolls 61, 61, to the building form 11a of the tire machine 11, there is included an auxiliary conveyor 67 that is hinged as at 68, to the conveyor means 60, and includes a spring 69 that interconnects the the conveyor 67 with conveyor means 60. In this manner, the auxiliary conveyor 67 is normally maintained in the full-line position of Figure 1 until such time as the weight of the advancing tread stock T beyond the pivot point 68 causes the auxiliary conveyor 67 to move to the chain-dotted position of Figure 1, where the tread stock T can be delivered onto the building form 11a.

As previously indicated, the servicer 10, in addition to the just-described apparatus for dispensing treated stock T, includes apparatus for delivering breaker stock B and chafer stock C to the machine 11.

Accordingly, in Figure 2, for example, there is illustrated a stock roll 70, carrying breaker stock B, and a pair of stock rolls 71, 72, each of which carries chafer stock C. Additionally, the usual rolls 70a, 71a, and 72a are provided to receive the separating liner L that is provided between all uncured rubber stock, and these liner rolls, as well as the stock rolls 70, 71 and 72 are all supported by having their axial ends journalled in the usual vertical supports 73, 73. A watchspring type windup mechanism 74, 74, may be employed in known manner if desired, between each stock roll and its companion liner roll.

To the end of delivering breaker stock B and chafer stock C to the building form 11a, there is provided a stock pan 80 that is shiftable on an inclined track 81a between the full and chain dotted line positions of Figure 1 upon the displacement of piston 82. This pan 80 includes a driven conveyor belt 81 played about rolls 82a, 82a that are in turn driven by motor 83 in the manner shown in Figure 4. Also employed in this regard are the usual idler rolls 84, 84 provided for the purpose of guiding the stock in its course of movement between the stock roll and the pan 80.

*Operation of the servicer*

In use or operation of the improved servicing machine 10, the same is first equipped with fresh stock rolls of breaker stock B and chafer stock C; the same being applied on the stock rolls 70, 71 and 72, with the separating liner L thereof being received over the respective liner rolls 70a, 71a and 72a upon operation of the windup mechanism 74 in known manner. A length of breaker stock B and chafer stock C may then be withdrawn from the appropriate stock rolls and placed on the conveyor belt 81 so as to be ready for use when operation begins.

In order to supply the servicer 10 with tread stock T, the same is first lowered to the position of Figure 3 by causing the motor 59 to unwind so that the cable 56 plays out over the pulley 57 and allows the top plate 31 to be lowered with respect to the tubular elements 21a, 22a and 23a. With the apparatus in the position of Figure 3, a strip of tread stock T may be fed onto one end of the series of rolls 61, 61, and upon energization of the motor 64, the same may be advanced by the driven rolls 61, 61, at which time the motor 64 may be stopped. At this point, the motor 59 may be energized to wind up the cable 56 over sheave 57 and windup reel 58, and the plate 31 will be slightly raised so as to have the tines 31a, 31a thereof passed through the spaces defined between the adjacent rolls 61, 61. Continued vertical lifting of the plate 31 will result in the tines 31a, 31a, contacting the tread stock T and causing the same to be lifted off the rolls 61, 61. This upward movement of the plate 31, by the cable 56 as just described, will not effect the remaining plates until such time as the lower plate 41 strikes the plate 42. Just prior to this point of contact between the plates 41 and 42, the motor 59 may be stopped and the equipment maintained in this position. At this time, a second roll of tread stock may be fed onto the rolls 61, 61 by actuating the motor 64, and the plate 32 may be raised past the rolls 61, 61 by motor 59 to effectuate transfer of this second tread stock T from rolls 61, 61 to tines 32a, 32a. This lifting operation may be repeated with subsequent tread strips to effectuate their transfer to the tines 33a, 33a; 34a, 34a; and 35a, 35a, until the machine is in the position of Figure 2, which may be considered as its fully loaded position.

With the servicer 10 fully loaded with six tread stock strips, as just described, operation of the overall servicing function of the servicer 10 may be commenced. To this end, the servicer 10 may be rolled on tracks 12, 12 into its proper position adjacent the tire building machine 11; and at this time the piston 82 may be actuated to move the pan 80 into dispensing position with respect to the building form 11a. With the pan 80 thus positioned, the building form 11a may be rotated and simultaneously, the motor 83 may be started to cause movement of the conveyor belt 81 to thus advance breaker stock B and chafer stock C into a position where the same can be dispensed upon the rotating building form 11a. When a sufficient length of breaker stock B and chafer stock C has been supplied to the building form 11a, the motor 83 may be stopped and the fabric stock severed in known manner. This severance may be followed by the usual smoothing or stitching operator wherein the stock is accurately positioned around the building form 11a in superposed condition over the previously applied fabric plies. With the breaker and chafer stocks applied, the piston 82 may be retracted; it being understood that the motor 83 may be re-energized to take up the slack with respect to the stock carried on the conveyor belt 81.

Tread stock T may now be supplied to the building form 11a by first causing the same to rotate in known manner; after which the motor 64 may be energized to cause rotation of the rolls 61, 61, so as to move the tread stock T to the right of Figure 1. As the advancing tread stock T passes the pivot point 68, the weight of the same about this pivot point 68 will overcome the force of the spring 69 and the auxiliary conveyor 67 will swing downwardly into the chain-dotted line position of Figure 1. Continued rotation of the rolls 61, 61 will result in tread stock T being dispensed to the rotating surface of the building form 11a. When the last of the tread stock T has left the rolls 61, 61, the auxiliary conveyor 67, as the result of spring 69, will swing upwardly to the full dotted line position, and will accordingly be out of the way for future building operations. At this time, the motor 59 may be energized to operate in the reverse direction to thus allow the tines 35a, 35a of the plate 35 to drop downwardly between the rolls 61, 61 and deposit a second tread stock T thereon.

At this point, the servicer 10 may be rolled on tracks 12, 12 out of its position adjacent the building form 11a of the machine 11, at which time a fabric ply servicer may be rolled into position on the same tracks 12, 12 for commencement of another cycle of tire building operation. When the fabric applying servicer has dispensed the requisite number of fabric plies, the same may be rolled longitudinally of the machine 11 and simultaneously therewith, the servicer may be re-positioned as above described for repetition of its dispensing cycle as just described.

It will be seen from the foregoing that there has been provided a simple and efficient servicing apparatus for supplying tread, breaker and chafer stock to a pneumatic tire building machine. It has been illustrated how this servicer can be moved longitudinally of the building form 11a so as to be easily moved into and out of dispensing position with respect to the machine 11.

It has been further illustrated how this servicer is provided with facilities for receiving sufficient stock material to build a plurality of pneumatic tires without the necessity of being restocked. Attention is also directed to the fact that the servicing apparatus described in conjunction with the tread dispensing mechanism is equally capable of being utilized for supplying predetermined lengths of fabric stock having wire cord elements.

The foregoing paragraphs have also indicated that several modifications of the invention are possible without material departure from the scope of this specification. For example, the operation of the servicer 10 could be cycled by the use of known electronic devices so as to time the movement of the piston 82 to the cycled energization of the various motors 59, 64 and 83. Additionally, it is to be understood that indexing means could be supplied in conjunction with the motor 59 whereby each plate would be raised or lowered to a predetermined height upon one period of energization of the motor 59, to thus eliminate any possibility of human error occurring in this regard. It is also contemplated that different forms of known prior art types of equipment could be employed for supplying the breaker and chafer stock, respectively, and additionally, automatic cutoff means could be provided for severing this stock material as the same was carried upwardly on the pan 80.

Accordingly, modifications of the invention may be resorted to without departing from the spirit thereof or the scope of the appended claims.

What is claimed is:

1. A servicer for dispensing uncured rubber stock material to a pneumatic tire making machine, comprising; a frame, including a base and a substantially horizontal platform spaced vertically of said base; a plurality of substantially vertical guides carried by said base and extending above and below the plane of said platform; at least one stock rack movable vertically on said guides and having tine supports provided thereon to overlie said platform; a stock conveyor, carried by said platform and having the dispensing end thereof disposed adjacent said tire machine and including roller elements that define open spaces at one end thereof and which are disposed out of vertical alignment with said tine supports, whereby said tine supports can be moved through the plane of said rolls upon shifting of said stock racks with respect to said guides; a second stock conveyor having its dispensing end disposed adjacent said tire making machine; and means for selectively positioning either of said conveyors in dispensing position with respect to said tire making machine.

2. A servicer for dispensing uncured rubber stock material to a pneumatic tire making machine, comprising; a frame, including a base and a substantially horizontal platform spaced vertically of said base; a plurality of substantially vertical guides carried by said base and extending above and below the plane of said platform; at least one stock rack movable vertically on said guides and having tine supports thereon overlying said platform; a stock conveyor, carried by said platform and having the dispensing end thereof disposed adjacent said tire machine and including roller elements that define open spaces at one end thereof and which are disposed out of vertical alignment with said tine supports of said stock racks, whereby said tine supports can be moved through the plane of said rolls upon shifting of said stock racks with respect to said guides; said stock conveyor being defined by a primary conveyor portion and an auxiliary conveyor portion that is pivotally connected to one longitudinal end of said primary conveyor so as to be horizontally coextensive therewith; said auxiliary conveyor having the dispensing end thereof overlying said tire making machine.

3. A servicer for dispensing uncured rubber stock material to a pneumatic tire making machine, comprising; a frame, including a base and a substantially horizontal platform spaced vertically of said base; a plurality of substantially vertical guides carried by said base and extending above and below the plane of said platform; at least one stock rack movable vertically on said guides and having tine supports thereon overlying said platform; a stock conveyor, carried by said platform and having the dispensing end thereof disposed adjacent said tire machine and including roller elements that define open spaces at one end thereof and which are disposed out of vertical alignment with said tine supports of said stock racks, whereby said tine supports can be moved through the plane of said rolls upon shifting of said stock racks with respect to said guides; said stock conveyor being defined by a primary conveyor portion and an auxiliary conveyor portion that is pivotally connected to one longitudinal end of said primary conveyor so as to be horizontally coextensive therewith; said auxiliary conveyor having the dispensing end thereof overlying said tire making machine; and means for normally urging said auxiliary conveyor out of dispensing position over said tire making machine.

4. A servicer for dispensing uncured rubber stock material to a pneumatic tire making machine, comprising;

a frame, including a base and a substantially horizontal platform spaced vertically of said base; a plurality of substantially vertical guides carried by said base and extending above and below the plane of said platform; a series of stock racks arranged in vertically shiftable relationship with said guides above the plane of said platform, and having a plurality of tine members overlying said platform; a series of guide plates corresponding in number to said stock racks and being arranged in vertically shiftable relationship on said guides below the plane of said platform; and means for maintaining a constant vertical spacing between each said stock rack and one corresponding guide plate during vertical movement thereof on said vertical guides.

5. A servicer for dispensing uncured rubber stock material to a pneumatic tire making machine, comprising; a frame, including a base and a substantially horizontal platform spaced vertically of said base; a plurality of substantially vertical guides carried by said base and extending above and below the plane of said platform; a series of stock racks arranged in vertically shiftable relationship with said guides above the plane of said platform, and having a plurality of tine members overlying said platform; a series of guide plates corresponding in number to said stock racks and being arranged in vertically shiftable relationship on said guides below the plane of said platform; means for maintaining a constant vertical spacing between each said stock rack and one corresponding guide plate during vertical movement thereof on said vertical guides; and a stock conveyor, carried by said platform and having the roll elements thereof disposed out of vertical alignment with said tine supports, whereby said tine supports can be moved through the plane of said roll elements upon shifting of said stock racks with respect to said guides.

6. A servicer for dispensing uncured rubber stock material to a pneumatic tire making machine, comprising; a frame, including a base and a substantially horizontal platform spaced vertically of said base; a plurality of substantially vertical guides carried by said base and extending above and below the plane of said platform; a series of stock racks arranged in vertically shiftable relationship with said guides above the plane of said platform, and having a plurality of tine members overlying said platform; a series of guide plates corresponding in number to said stock racks and being arranged in vertically shiftable relationship on said guides below the plane of said platform; and means for maintaining a constant vertical spacing between each said stock rack and one corresponding guide plate during vertical movement thereof on said vertical guides; said means including a series of tie rods of different lengths, with the longest of said tie rods interconnecting said stock rack and said guide plate that are spaced furthest from said platform with successively shorter tie rods respectively interconnecting stock racks and guide plates that are correspondingly closer to said platform with said shortest tie rod interconnecting said stock rack and guide plate closest to said platform.

7. The device of claim 4 further characterized by the presence of means for controlling the vertical movement of at least one said stock rack with respect to said guides.

8. The device of claim 5 further characterized by the fact that said stock conveyor includes means for rotating said rollers, whereby tread stock received thereon will be moved longitudinally of said conveyor.

9. A servicer for dispensing uncured rubber stock material to a pneumatic tire making machine, comprising; a frame, including a base and a substantially horizontal platform spaced vertically of said base; a plurality of substantially vertical guides carried by said base and extending above and below the plane of said platform; a series of stock racks arranged in vertically shiftable relationship with said guides above the plane of said platform, and having a plurality of tine members overlying said platform; a series of guide plates corresponding in number to said stock racks and being arranged in vertically shiftable relationship on said guides below the plane of said platform; means for maintaining a constant vertical spacing between each said stock rack and one corresponding guide plate during vertical movement thereof on said vertical guides; a stock conveyor, carried by said platform and having the roll elements thereof disposed out of vertical alignment with said tine supports, whereby said tine supports can be moved through the plane of said rolls upon shifting of said stock racks with respect to said guides; and an auxiliary conveyor having one end thereof pivotally connected to one longitudinal end of said stock conveyor.

10. A servicer for dispensing uncured rubber stock material to a pneumatic tire making machine, comprising; a frame; at least one guide member extending upwardly from said frame; at least one plate member shiftable vertically on said guide member; a plurality of tine members carried by said plate member and defining a horizontal rack having open spaces along one longitudinal edge; a horizontal conveyor carried by said frame and having the dispensing end thereof disposed adjacent said tire making machine and including roller elements that define open spaces at one end thereof, whereby said tines may pass through the plane of said conveyor; at least one stock roll carried by said frame and being disposed below the horizontal plane of said conveyor, whereby said tines may be vertically shifted above and below the plane of said conveyor without interference with said stock roll; and means for withdrawing stock from said roll and dispensing the same to said tire making machine.

11. The device of claim 10 further characterized by the fact that said last-mentioned means includes a conveyor pan shiftable longitudinally of said frame into and out of dispensing condition with respect to said tire making machine.

References Cited in the file of this patent
UNITED STATES PATENTS

| | | |
|---|---|---|
| 1,736,472 | Wego | Nov. 19, 1929 |
| 2,029,456 | Zuber | Feb. 4, 1936 |
| 2,558,903 | Kastner | July 3, 1951 |
| 2,671,495 | Iredell et al. | Mar. 9, 1954 |
| 2,716,437 | Wikle | Aug. 30, 1955 |